Figure 1:
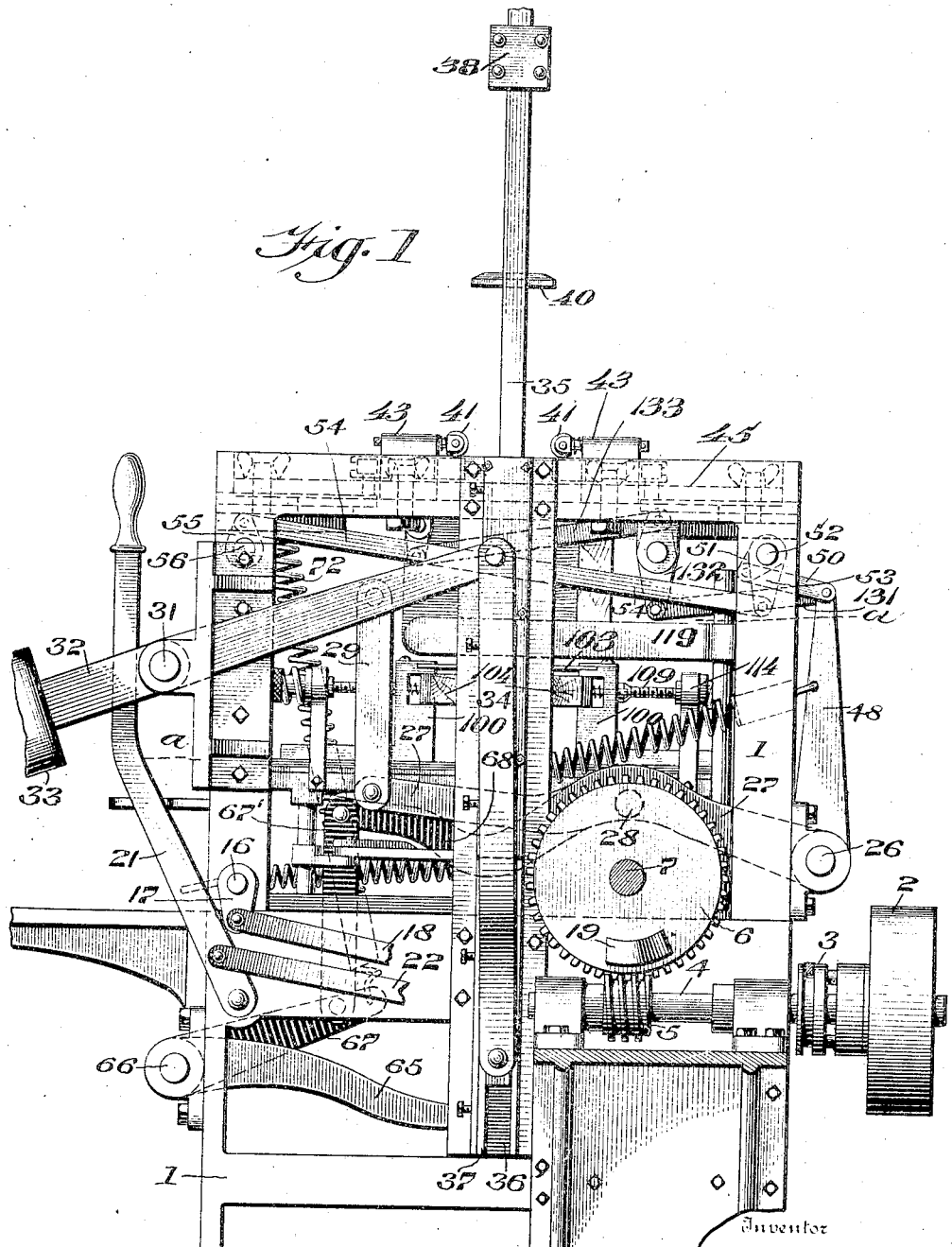

C. A. GARRETT.
PAPER BOX COVERING MACHINE.
APPLICATION FILED DEC. 23, 1907.

917,044.

Patented Apr. 6, 1909.
15 SHEETS—SHEET 1.

Witnesses

Inventor
Charles A. Garrett,
By Wiederscheim & Fairbanks
Attorneys

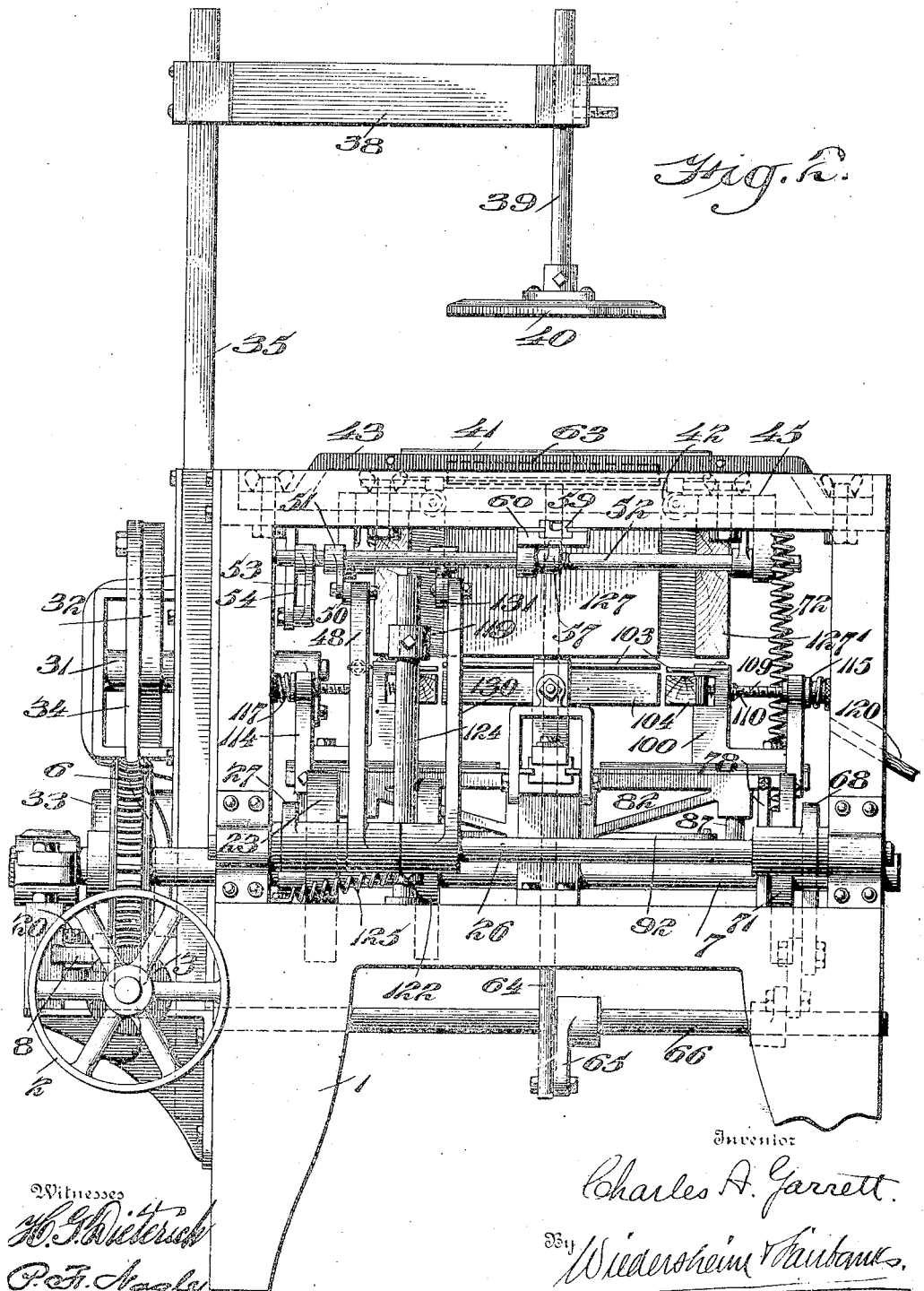

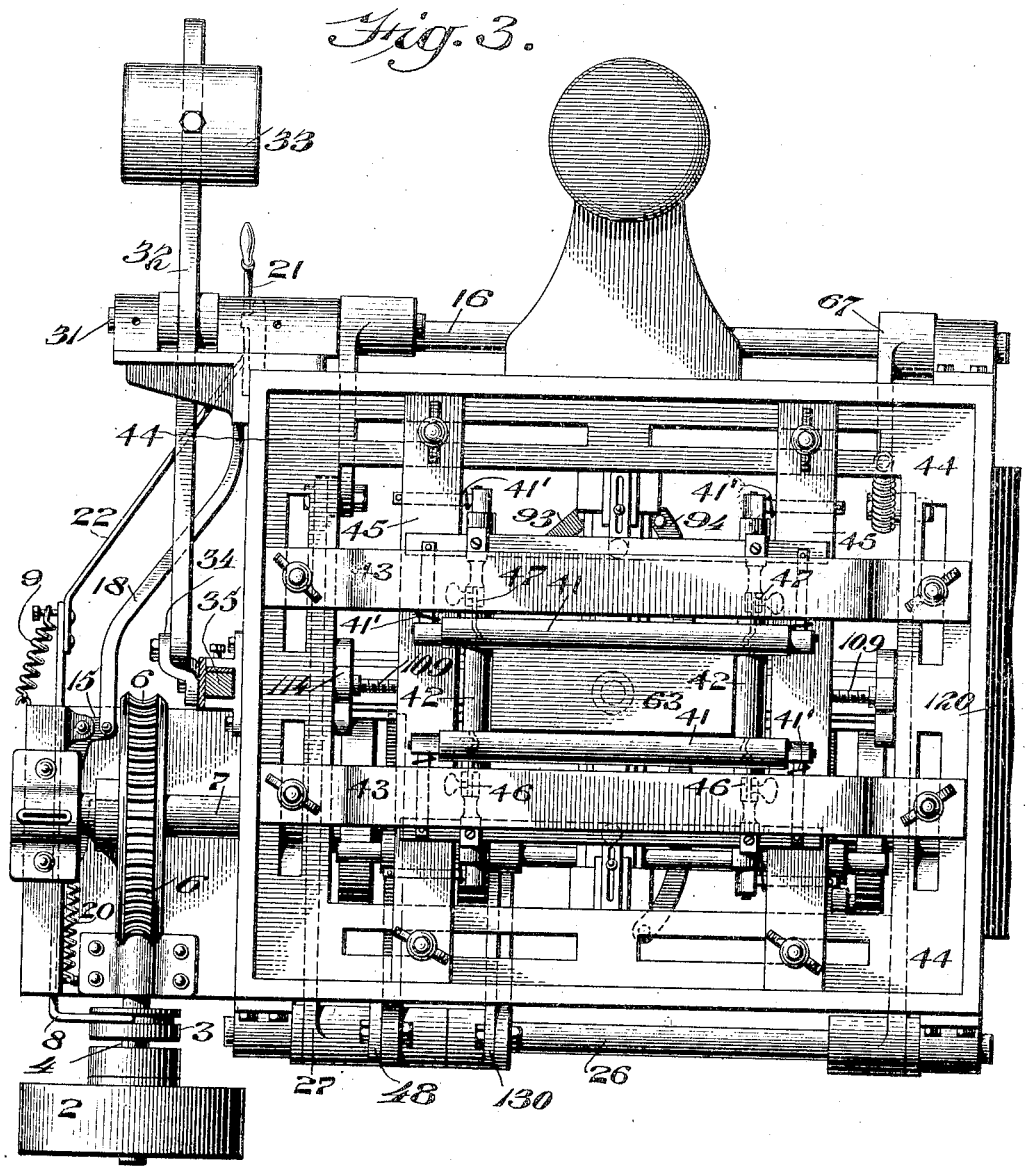

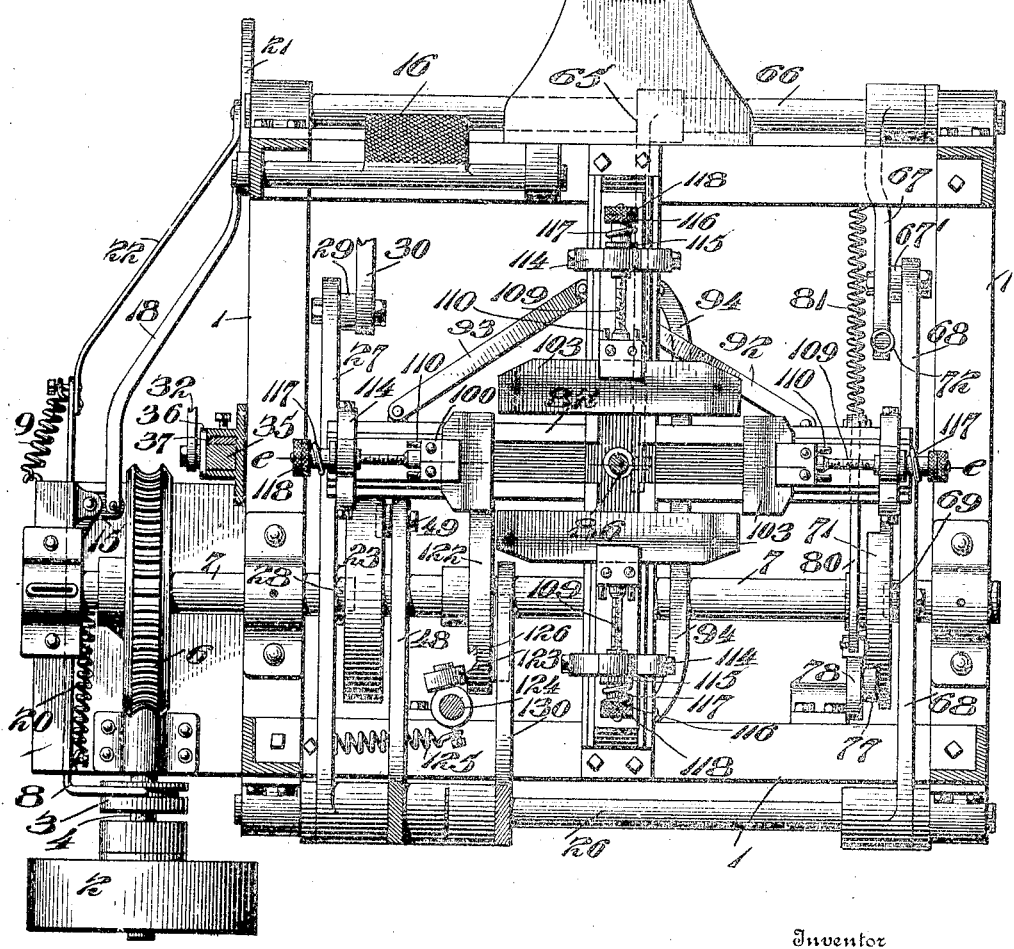

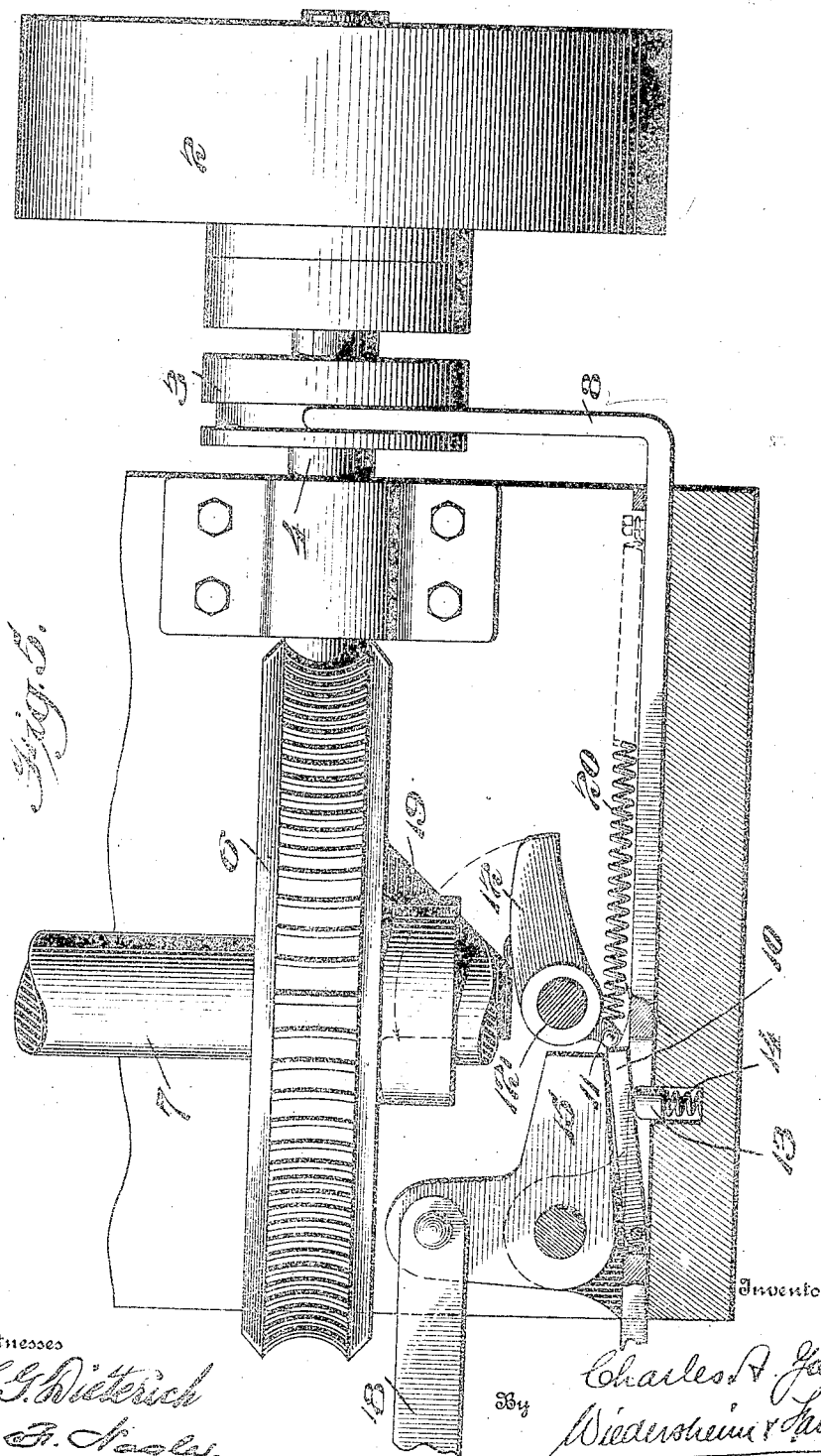

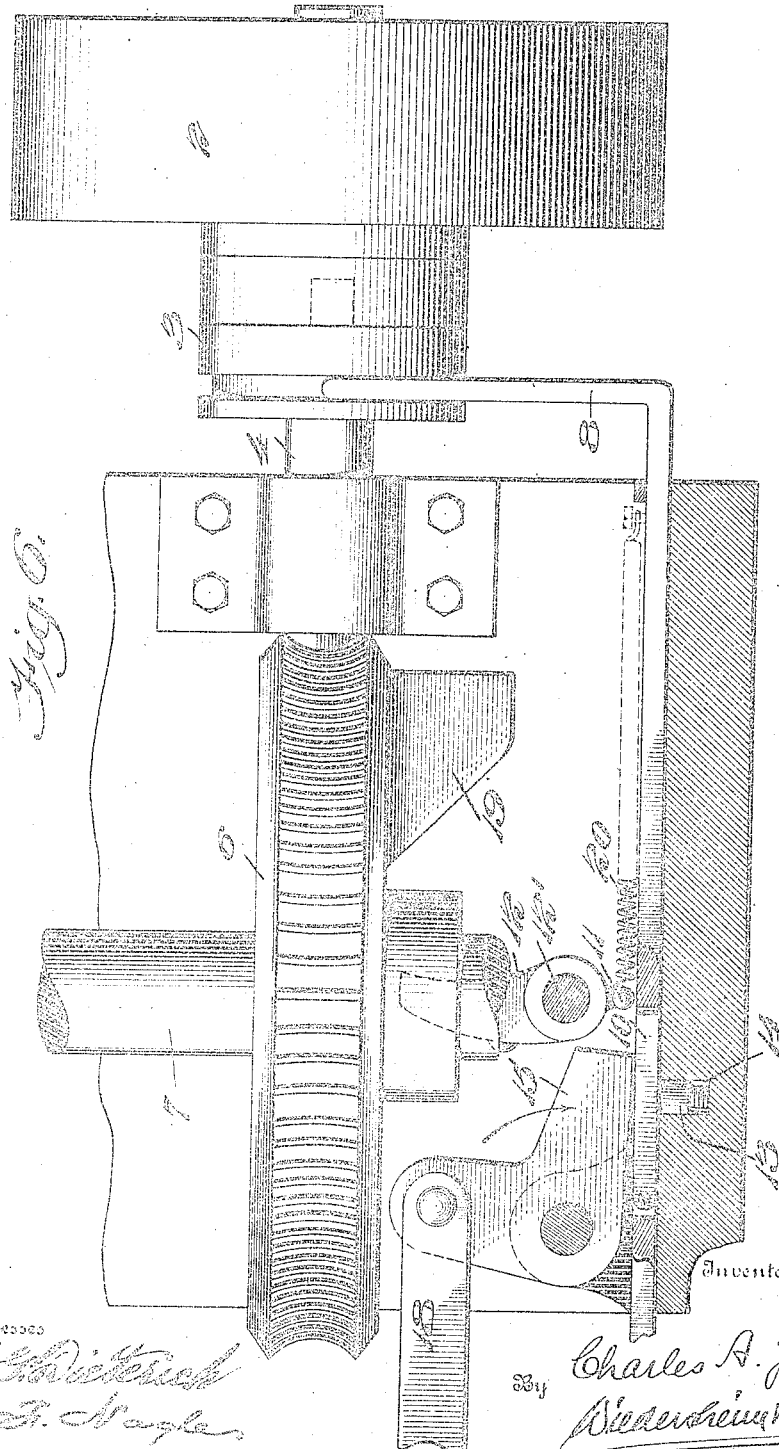

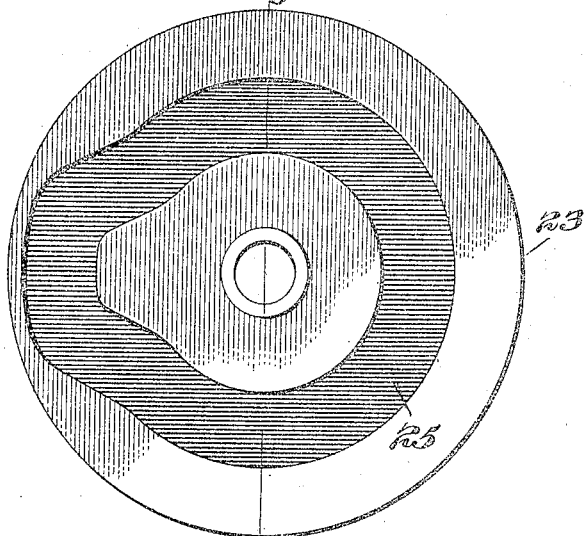
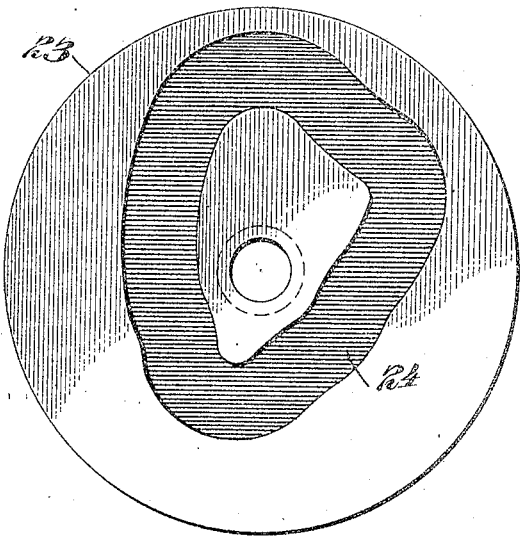
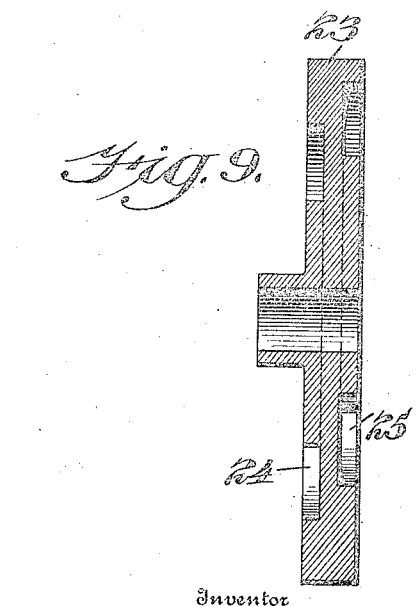

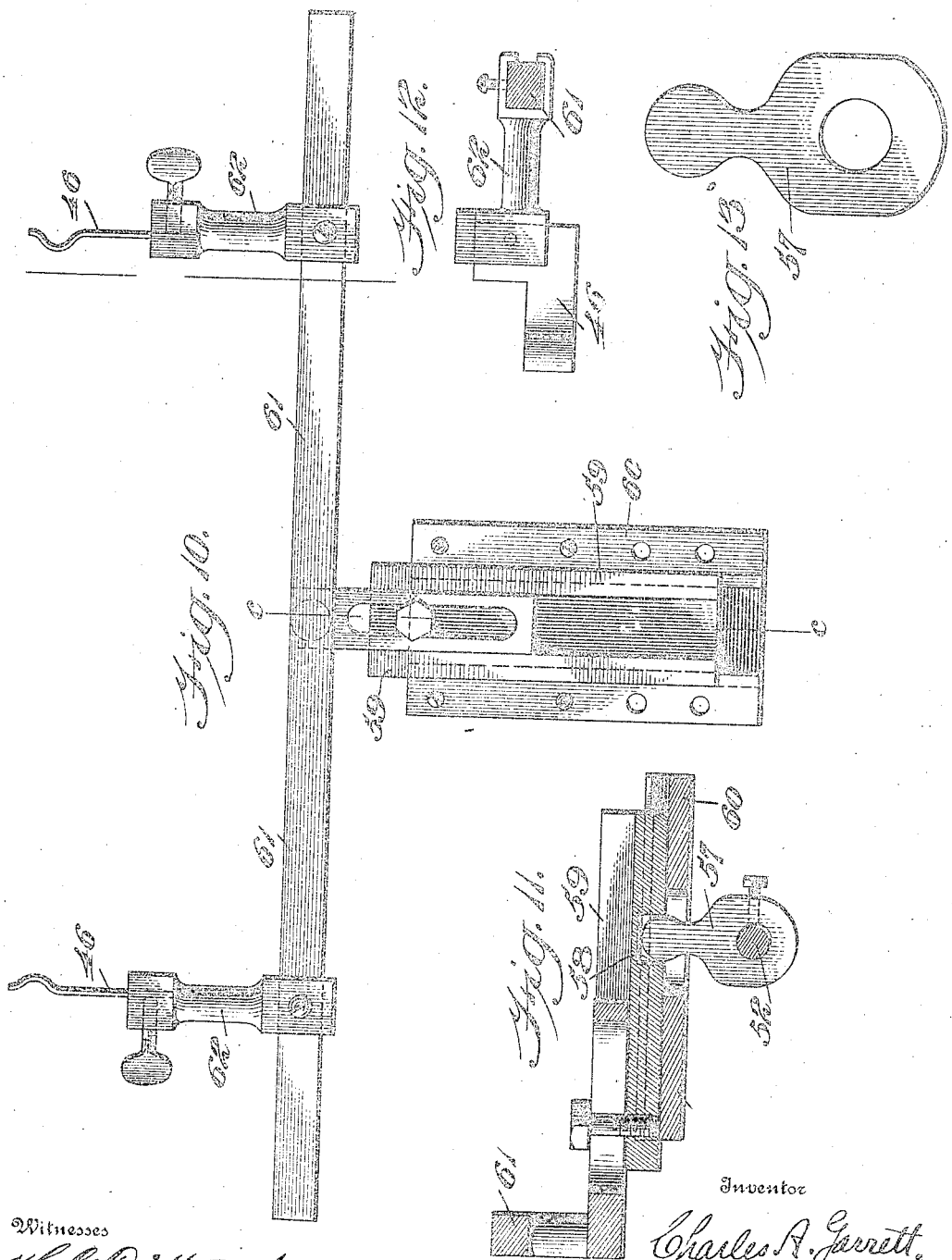

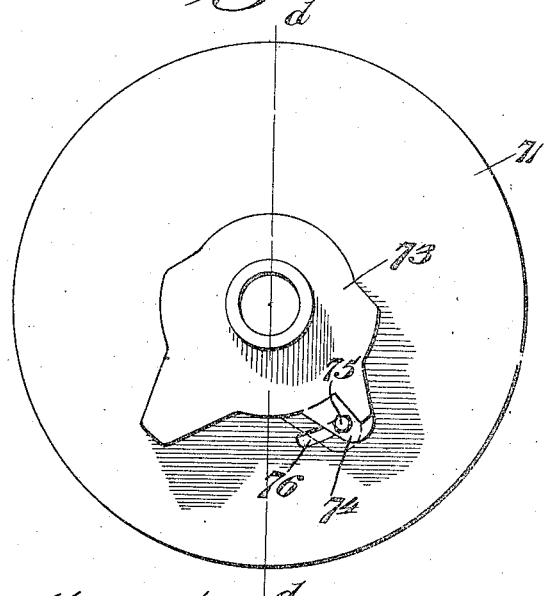
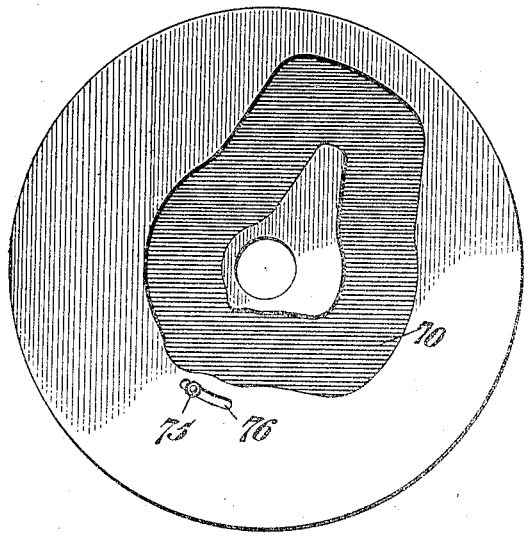
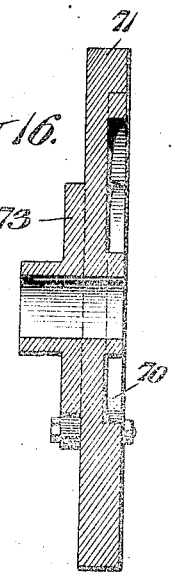

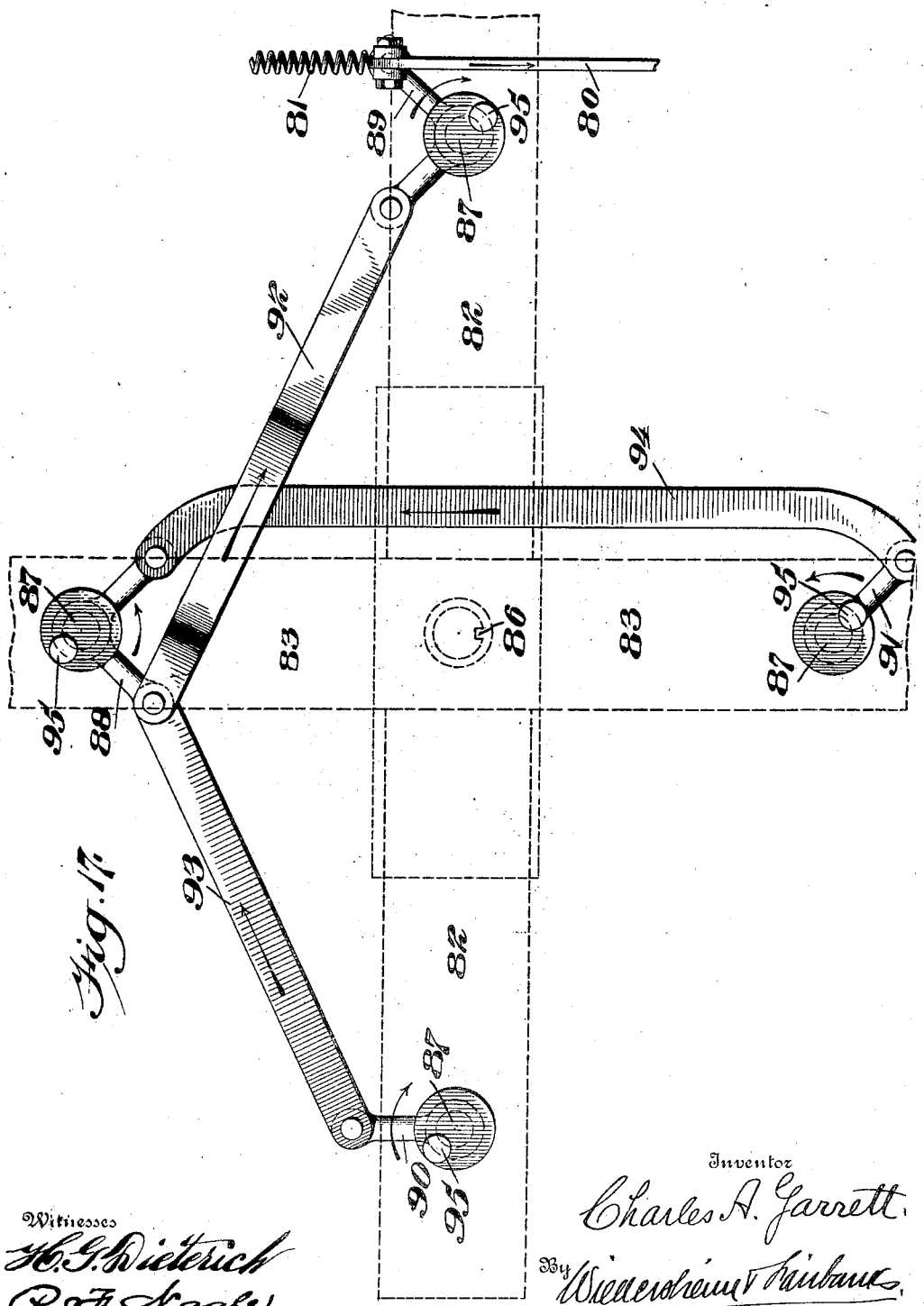

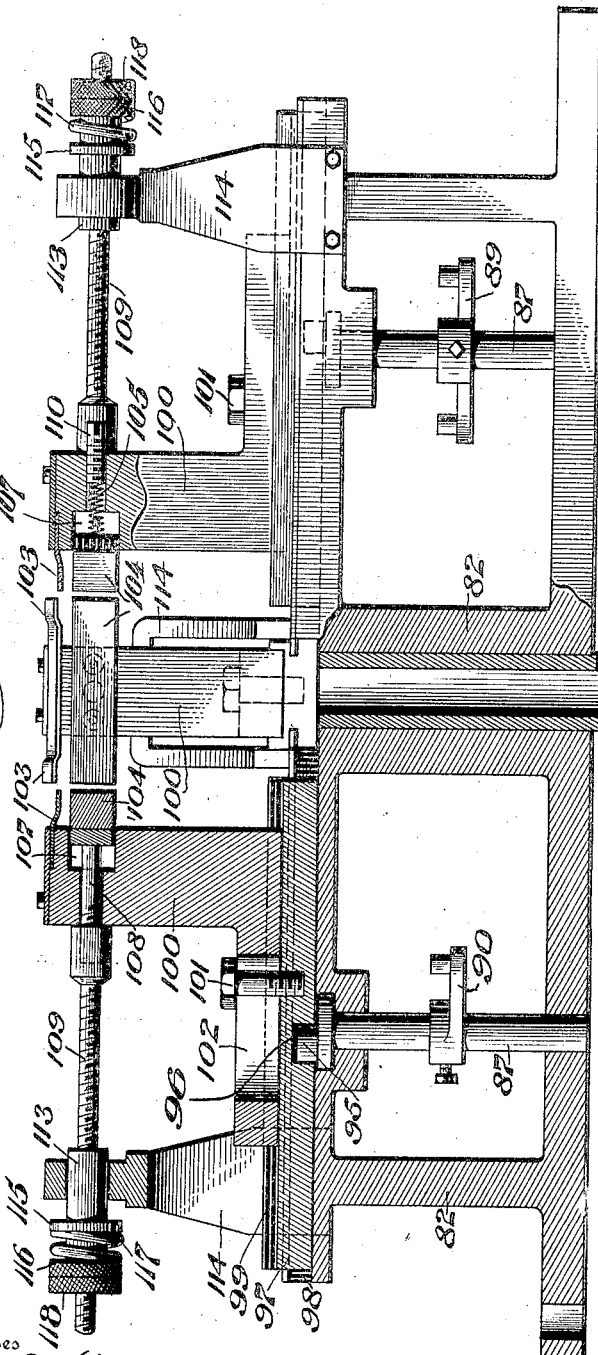

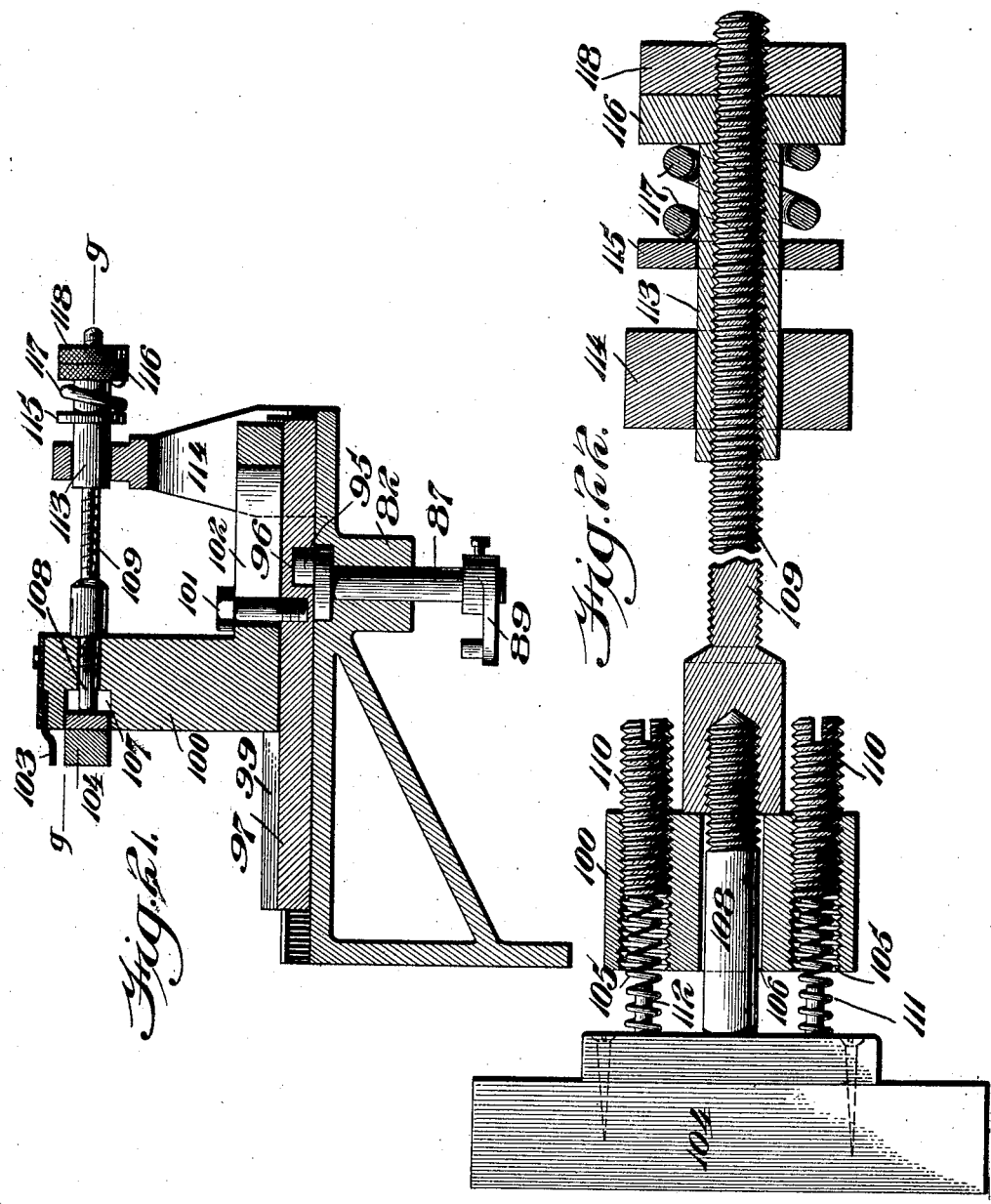

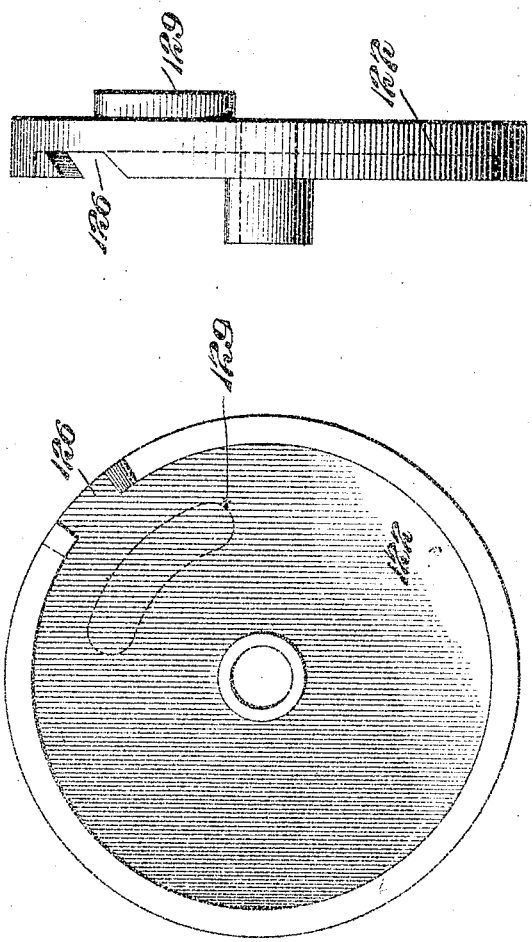

C. A. GARRETT.
PAPER BOX COVERING MACHINE.
APPLICATION FILED DEC. 23, 1907.
917,044.
Patented Apr. 6, 1909.
15 SHEETS—SHEET 14.
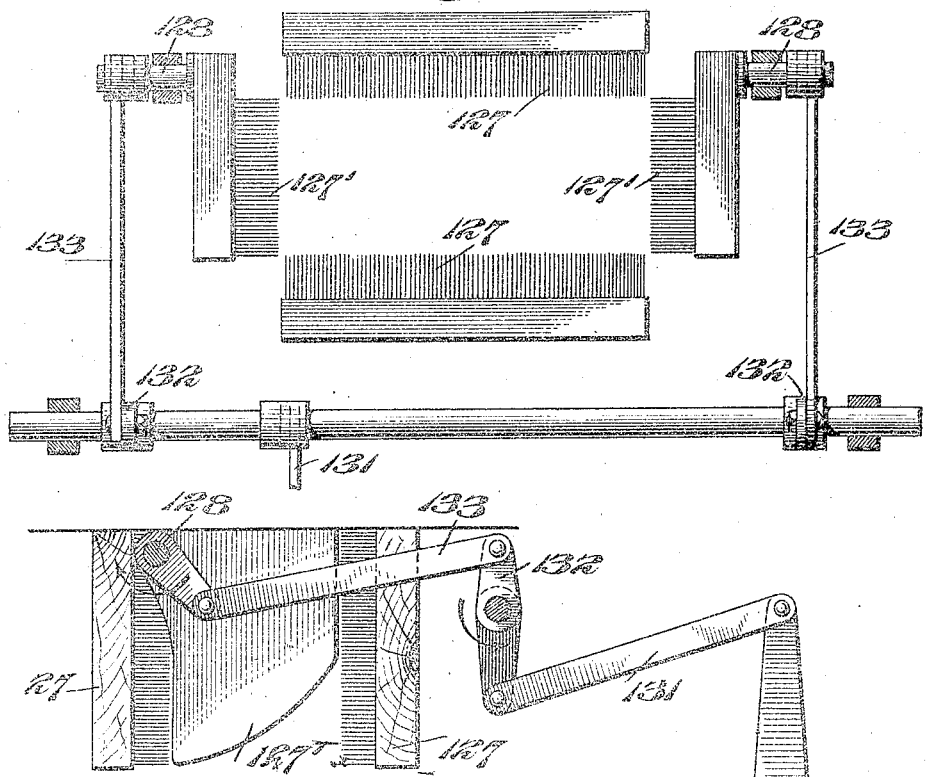
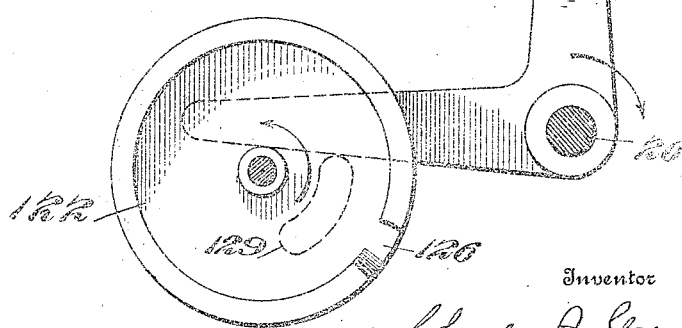
Inventor
Charles A. Garrett.
By Wiederstein & Fairbanks
Attorneys
Witnesses
H. F. Dieterich
P. F. Nagle C. A. GARRETT.
PAPER BOX COVERING MACHINE.
APPLICATION FILED DEC. 23, 1907.
917,044.
Patented Apr. 6, 1909.
15 SHEETS—SHEET 15.
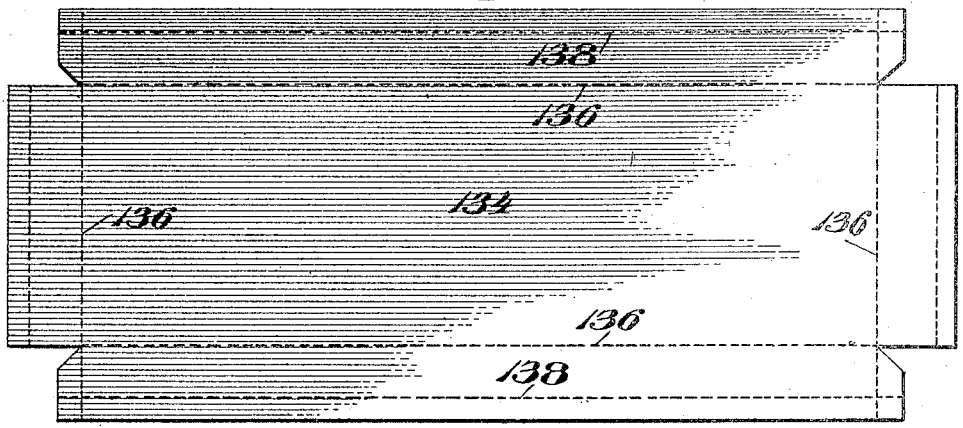
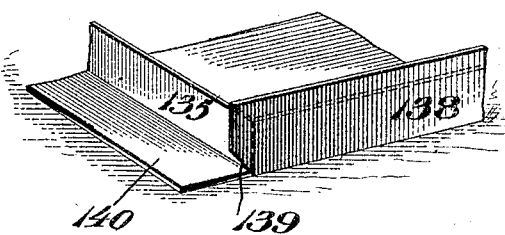 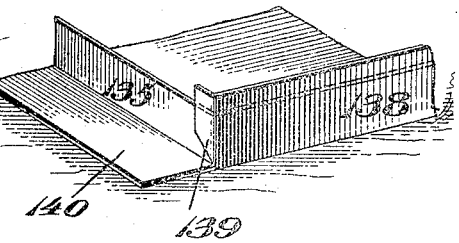
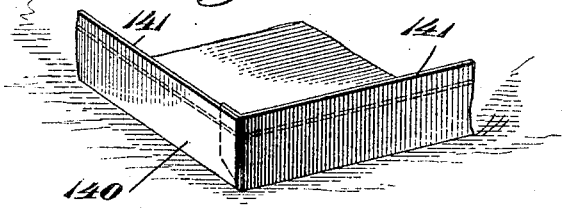 

UNITED STATES PATENT OFFICE.

CHARLES A. GARRETT, OF PHILADELPHIA, PENNSYLVANIA, ASSIGNOR OF ONE-HALF TO THE DATZ MANUFACTURING COMPANY, A CORPORATION OF PENNSYLVANIA.

PAPER-BOX-COVERING MACHINE.

No. 917,044.     Specification of Letters Patent.     Patented April 6, 1909.

Application filed December 23, 1907. Serial No. 407,796.

*To all whom it may concern:*

Be it known that I, CHARLES A. GARRETT, a citizen of the United States, residing in the city and county of Philadelphia, State of Pennsylvania, have invented a new and useful Paper-Box-Covering Machine, of which the following is a specification.

This invention relates to a machine for making paper boxes, in which a form and paper cover are inserted therein and after passing through a series of steps come out of the machine as a complete box.

It consists of a machine capable of performing all the steps in the manufacture of a paper box entirely automatically.

It further consists of mechanism for folding up the sides of the cover which mechanism is so mounted in the frame of the machine as to draw the cover tightly over the form at the same time that it does the folding.

It further consists of a means for removing the form holder from the box form at a predetermined time, during which period it is supported by a novel construction adapted to coöperate with a device for folding a portion of the cover into the path of the holder which the holder, in descending, turns inside the box form, and there presses it against the sides of the box form.

It further consists of a novel means for pressing the turned over portion of a cover against the top of the box.

It further consists of a novel guide means for the holder and box form which is adapted to prevent the cover for a box form getting misplaced during the preliminary steps in the machine and is also adapted to be automatically moved out of operative position during a step in the box making process.

It further consists of an automatic means for ejecting the completed box from the machine after the last step in the cycle of operation has been finished.

It further consists of an automatic controlling mechanism whereby the driving mechanism is disconnected and the machine brought to a stop as soon as the finished box has been ejected from the machine.

It further consists of a machine in which the parts accomplishing each operation are so adjusted and accurately timed that one step follows another immediately and with no stopping of the machine until the box is completed.

It further consists of other novel details of construction, all as will be hereinafter fully set forth.

For the purpose of illustrating my invention, I have shown in the accompanying drawings, one embodiment thereof which has been found in practice to give satisfactory and reliable results, although it is to be understood that the various instrumentalities of which my invention consists can be variously arranged and organized and that my invention is not limited to the precise arrangement and organization of these instrumentalities as herein set forth.

Figure 1 represents a side elevation of a complete machine embodying my invention. Fig. 2 represents an end elevation of the same. Fig. 3 represents a plan view thereof. Fig. 4 represents a section on line *a—a* of Fig. 1. Fig. 5 represents a plan view of my clutch mechanism in open position. Fig. 6 represents a similar view in closed position. Fig. 7 represents the box holder cam. Fig. 8 represents the wing dog cam. Fig. 9 represents a section on line *b—b*, Fig. 8, showing both cams. Fig. 10 represents a plan view of the wing dog carriage. Fig. 11 represents a section on line *c—c*, Fig. 10. Fig. 12 represents a detail view of the wing dog holder. Fig. 13 represents a detail view of the operating arm for the wing dog carriage. Fig. 14 represents the presser block cam. Fig. 15 represents the box carriage cam. Fig. 16 represents a section on line *d—d*, Fig. 14, showing both cams. Fig. 17 represents the presser block operating mechanism. Fig. 18 represents a section on line *e—e*, Fig. 4, showing the presser block mechanism. Fig. 19 is a detail of the presser block guide. Fig. 20 is a section on line *f'—f'*, Fig. 19. Fig. 21 is a section through one of the presser blocks. Fig. 22 is a section on line *g—g*, Fig. 21. Fig. 23 is a side view of the ejector cam. Fig. 24 is an end view of the same. Fig. 25 represents a plan view of the guide brushes, and operating connections. Fig. 26 represents a side view of the same showing the operating cam and connections. Figs. 27, 28, 29, 30 and 31 represent, respectively, steps performed in making the box.

Similar numerals of reference indicate corresponding parts in the figures.

Referring to the drawings:—1 designates the frame of a paper box machine which supports mechanism comprising my invention.

This mechanism is supplied with power from a driven pulley 2 and transmitted by means of a suitable clutch device 3 to the shaft 4, which carries a worm 5 adapted to mesh with a worm gear 6 mounted on a main drive shaft 7. The clutch operating mechanism is illustrated in Figs. 5 and 6 in its preferred form, that of a semi-automatic type, but, of course, any suitable shifting means may be employed to throw the clutch in or out at the proper time.

8 designates a rod adapted to shift the clutch 3 and is actuated by a spring 9 (see Figs. 3 and 4) to throw the clutch into operative engagement with the driving power. In order to hold the clutch normally disengaged, the rod 8 has pivoted thereto, a trip finger 10 adapted to engage a stop 11 formed on a pivoted arm 12 and hold the rod 8 from movement. The finger 10 is held in engagement with the stop 11, by any suitable means, as the spring pressed plunger 13 located in a recess 14 of the frame 1 and is moved to disengage the stop 11 by a bell crank lever 15 operated by a treadle shaft 16 through suitable connections 17 and 18.

The arm 12 is pivoted to the frame 1 on the pin 12' and is located in the path of a projecting lug 19 on the worm gear 6, by which lug 19 it is normally engaged to hold the rod 8 through the finger 10 against the action of the spring 9. The stop 11 besides holding the rod 8 from movement also serves to release the clutch 3 and stop the machine at a predetermined time and for this purpose, a spring 20 is provided which acts to swing the arm 12, as soon as the lug 19 releases it, to bring the stop 11 forward of the finger 10 again.

Referring to Fig. 5, the parts are seen with the clutch disengaged as the lug 19 holds the stop 11 in position to be engaged by the finger 10, held in operative position by the plunger 13. As soon as the treadle shaft 16 is rotated by the operator, the bell crank 15 presses the finger 10 out of engagement with the lug 11 when the spring 9 forces the rod 8 to throw the clutch in as shown in Fig. 6. The worm gear 6 is thus started and carries the lug 19 away from the arm 12 which is swung by the spring 20 to bring the stop 11 into position to engage the finger 10, as soon as the treadle releases it. The lug 19 has now about completed its revolution and picks up the arm 12 and swings it back to normal position, carrying the stop 11 against the finger 10 to return the rod 8 to release the clutch. In connection with the releasing of the clutch, a lever 21 is connected by a link 22 to the rod 8 for manually stopping the machine at any time in its operation. Keyed to the main shaft 7 is a double side face cam 23, having cam grooves 24 and 25 therein, the former 24 controlling the movement of an upper plunger 39 and the latter 25 a movement to be hereinafter described. Adjacent the shaft 7 is a counter shaft 26 suitably mounted on the frame 1 and carrying a cam lever 27 having a projection 28 adapted to fit in the cam groove 24 whereby the irregular contour of the groove gives to the lever 27 a number of oscillations of varied length. This cam lever 27 is suitably connected as by a link 29 to a second lever 30 keyed to a shaft 31 suitably mounted on the frame 1 and on which is carried the plunger operating lever 32. A counterweight 33 on the lever 32 serves to balance the working parts. The end of the lever 32 is connected through the link 34 to a rod 35 adapted to reciprocate in the guide channel 36. A wear plate 37 may be adjustably secured in this channel to take up for any wear on the parts. The rod 35 carries an overhanging arm 38 in which is secured the plunger 39 adapted to carry a detachable holder 40 of the size of the box to be made. It will now be seen that as the cam 23 rotates, the plunger 39, through the cam lever 27 and its connections, will be reciprocated with a varied stroke due to the contour of the groove 24. The holder 40 is so positioned over the top of the frame 1 as to pass, when lowered, between two pairs of rollers 41 and 42. The rollers 41 are yieldingly mounted as by spring 41' on strips 43 adjustably secured for sliding movement in the top 44 of the frame 1, while the rollers 42 are similarly mounted on strips 45 likewise adjustably secured to the top 44. The adjustment of the strips 43 and 45 allows the rollers 41 and 42 to be moved relative to each other so that boxes of different sizes may be made on the same machine by a simple adjusting of these parts. It will be noted that the strips 43 are raised above the strips 45 so as to provide a space between the pairs of rollers to allow folding members or wing dogs 46 and 47 to move in and complete one step in the box making cycle. The wing dogs 46 and 47 are operated from the cam groove 25 in the cam member 23 by means of the construction seen to best advantage in Figs. 1, 4, 10 and 11. This construction consists of a bell crank lever 48 sleeved on the shaft 26, one of its arms having a pin 49 adapted to travel in the groove 25 and the other arm being connected by a link 50 to a crank 51 mounted on shaft 52 suitably supported in the frame 1. A crank 53 keyed to shaft 52 transmits any movement of the shaft to a connecting rod 54 which joins at its other end a crank 55 mounted on a shaft 56 also secured to the frame 1. These shafts 52 and 56 serve to reciprocate the wing dogs 46 and 47 at the proper time, the motion being transmitted by fingers 57 secured to the respective shafts 52 and 56. These fingers 57 are adapted to fit into recesses 58 in sliding blocks 59 mounted on guides 60, so that any rotation of the shafts will turn the fingers 57 and move the blocks 59 either forward or backward. The block 59 has a bar 61 adjustably fastened to it on which are mounted holders 62 for the wing dogs 46 and 47. The holders 62 are preferably constructed so as to allow removal and adjustment of the wing dogs. It will of course be understood that the shaft operating cranks 53 and 55 are located in opposite relation on their respective shafts in order to bring the wing dogs together.

Turning to Fig. 2 of the drawings, it will be seen that the holder 40 in its downward movement through the rollers 41 and 42 and wing dogs 46 and 47 has come in contact with the supporting carriage 63, which is also adapted for reciprocating movement.
The purpose of this carriage 63 is to coöperate with the holder and also to support the box during a series of operations when the holder 40 has been temporarily removed from the box and it is operated through the plunger 64 and crank 65 on shaft 66. Motion is transmitted to the shaft 66 from the main shaft 7 through a pair of arms 67 and 68 connected by a link 67', the former 67 being secured to the shaft 66 and the latter 68 to the counter shaft 26. On the arm 68 is a projecting lug 69 fitting in a cam groove 70 of the double cam 71 mounted on the main shaft 7, the contour of which groove 70 is substantially similar to the groove 24 in member 23 so as to give to the plunger 64, a reciprocating movement closely following the movement of the plunger 39. A spring 72 is suitably attached to the shaft 66 to return the same to normal position and carry the carriage back to its position between the rollers 41. The cam member 71 is provided on the opposite side from the cam groove 70 with a second cam face 73, one of the engaging surfaces of which is formed as an adjustable lug 74 preferably secured by a bolt 75 passing through a slot 76 in the member 71. By means of this adjustable lug, the action of the cam may be varied so as to give a different length stroke to the part operated by the cam which is essential where boxes of different sizes are to be made on the same machine. The cam surface 73 is engaged by a roller 77 secured in a link 78 pivoted in bearing 79 and carrying on its end, an operating rod 80. The roller 77 is held in engagement with the cam surface 73 by means of a spring 81 secured to the frame 1.

In Figs. 17 and 18, detail views are shown of the parts operated by the rod 80 and which parts form a feature of my novel box making machine. A cross frame 82 carrying side extensions 83 is secured to the main frame 1 and is apertured at the center to receive a guide 84 for the lower plunger 64, a slot 85 being cut in the side of the guide 84 to receive a pin 86 on the plunger 64 and thereby prevent rotation of the plunger. Suitably mounted for oscillating movement in the frame 82 are four small shafts 87, two carrying bell cranks 88 and 89 and two simple cranks 90 and 91. One arm of the bell crank 89 is connected to the rod 80 and the other arm is connected by a link 92 to an arm of the bell crank 88 which also carries a link 93 connected to the crank 90, while the other arm of the bell crank 88 is connected to the crank 91 by a link 94. The four shafts have also secured thereto, cranks 95 adapted to engage recesses 96 in slides 97. From Fig. 17 it will be apparent that a movement of the rod 80 will produce a motion in the several connections as indicated by the different arrows and through the cranks 95 will move all the slides 97 and tend to converge them at the center of the frame. A guide way 98 is formed in the top of the cross frame 82 and its extensions 83 adapted to receive the slides 97 which in turn have a guide 99 to seat blocks 100. These blocks 100 are adjustably connected to the slides 97, as by the bolt 101 and slot 102, and have suitably secured thereto, the finger 103 and presser blocks 104. The latter are so mounted as to be held stationary during a portion of the movement of the blocks 100 to accomplish which the following construction illustrates the preferred arrangement, though of course, other means may serve the same end. As these blocks 100 are all of identical construction, a description of one will serve for all. The block 100 is provided with a plurality of apertures 105 and 106 extending through the block and opening into a slot 107 adapted to receive the presser block 104, which is secured to a bolt 108 passing through an opening 106 and threaded for adjustment into a spindle 109. Within the apertures 105 are set screws 110 engaging springs 111 fitting on pins 112 projecting from the block 104. It will be apparent that a movement of the block 100 will advance at the same time the presser block 104 until it meets some resistance as the box form, when the springs 111 are compressed and allow the presser block to stop while the block 100 still advances. The spindle 109 is threaded for a portion of its length and carries a sleeve 113 supported for sliding movement in a standard 114 secured to the cross frame 82. A follower 115 rides on the sleeve 113 between which and the thumbscrew 116 is a spring 117, the function of which will be hereinafter referred to. A lock nut 118 holds the sleeve 113 in proper adjustment.

The operation of the blocks 100 is controlled entirely by the cam face 73 which moves them to perform a series of steps in the process of making the box. The first movement advances the blocks 100 until the presser blocks 104 engage the sides of the box in the machine, when the forward movement is stopped while the holder 40 is removed from the box. After this action, the blocks 100 are again moved forward to bring the fingers 103 up to complete a step, the presser blocks 104 being stationary and the springs 111 taking up this forward motion since the follower 115 has now engaged the stop support 114 and prevents the presser blocks 104 from further movement which may crush the box. The cam 73 now moves the fingers 103 back to their former position and the holder 40 is again lowered inside of the box when the cam 73 throws the block 100 forward far enough to firmly press against the sides of the box. This extra forward movement is allowed for by the compression of the spring 107 and as soon as the fingers 103 have reached a position over the top edges of the box, the cam 73 allows a slight release of the form carriage, which action presses the top of the box firmly against the box form and completes the last step in the process. In order to remove the completed box from the machine an automatic ejector 119 is provided which is adapted to strike the box at the proper time and eject it as shown in Fig. 2 at 120. The preferred manner of operating this ejector 118 is through a cam 122, on the main shaft 7, coöperating with a cam roller 123 carried by a pivoted member 124, which member 124 is held by a spring 125 to normally press the roller 123 against the cam face 122. It will be seen that as soon as the slot 126 of the cam, comes into alinement with the roller 123, the spring 125 quickly swings the member 124 and with it the ejector 118 which strikes the box and throws it out of the machine.

Referring to Figs. 25 and 26, a portion of the machine will be seen which is adapted to come into use when a box of the loose cover type is to be made, that is, one in which the paper cover of the box is not glued on the sides or top at all, but simply on the inside of the box. Therefore, in view of the loose portion of the cover, some means must be provided to hold it in place during the downward travel of the box before it reaches the presser block holders. Preferably brushes 127 and 127' are used for this purpose and are so located as to form walls around the line of travel of the box, the longitudinally disposed brushes 127 being secured in any suitable manner to the frame 1. The end brushes 127', in order to allow the ejector to properly throw out the completed box, have to be moved at the proper moment and accordingly are mounted for swinging movement on the shafts 128 operated from the cam 129 on the main shaft 7. Suitable connections as the bell crank 130, link 131, lever 132 and link 133 are of course interposed to swing the brushes down just before the ejector is brought forward to do its work. Preferably the same cam that operates the ejector is provided with another face to operate the lever 130, though of course these may both be used as separate members.

The operation of the device will now be readily understood by those skilled in the art. In Figs. 27 to 31 are shown the several steps in folding the box cover 134 over the box form 135 and well illustrate the functions performed by the several parts of the machine. The box cover 134 is received by the operator of the machine, cut to the correct size and shape and coated with glue on one side ready for the box form 135. This form is placed by the operator on the cover and takes the position indicated by the dotted lines 136. The fresh glue on the cover adheres to the form and they are both fitted on the holder 40, which accurately fits the inside of the form 135. By pressure on the treadle the operator rotates the shaft 16 which through connecting rod 18 and bell crank 15 releases catch 10 allowing spring 9 to throw rod 8 to engage the clutch 3 with the driving mechanism. The main shaft 7 then begins its rotation and transmits the movement of the cam 24 through the described connections to the rod 35 which thereby moves downward taking the holder and box parts along with it. In its downward movement it first passes the rollers 41 which engage and fold the side flaps 138 of the cover, as shown in Fig. 28, into contact with the sides of the form 135. At the same time that the rollers 41 are met, the holder 40 reaches the lower plunger table 63, the pressing contact with which securely binds together the bottom of the box, and both table and carrier continue the movement together. Passing the rollers 41, the carrier next comes into alinement with the wing dogs 46 and 47 which are at this moment swung forward by the cam 25 to meet the wings 139 on the side strips 138 and fold them over the ends of the box form as shown in Fig. 29. After the wing dogs have completed this folding step, the rollers 42 are engaged and fold up the ends 140 so that the box assumes the form illustrated in Fig. 30. Of course it will be understood that the downward movement of the carrier and table has been a continuous one, the wing dogs being so timed in their action as to meet the wings at the proper moment. Having now folded the sides and ends of the box, the remaining steps consist of turning the flap 141 inside the box and pressing the cover at all points to glue it securely to the form. These steps are all done while in the presser jaws 104 which are reached immediately after the rollers 42. This operation is an important feature of my invention and is controlled by the cam 73 which is accurately faced to move the presser blocks exactly to perform each step in the cycle of completing the box.

After passing the rollers 42, the holder 40 and carrier 63 move down to a position in line with the presser jaws 104 where the cams controlling the holder and carrier allow them to remain stationary while the cam 73 begins its first operating step. This step consists of advancing the blocks 100 until the jaws 104 engage the four sides of the box at which time the cam 24 raises the holder 40 to allow the fingers 103 to operate. The blocks 100 continue their converging movement, but as the follower 115 has come into contact with the stop support 114 and the jaws 104 have clearance in the recess 107, the springs 112 compress, holding the jaws 104 stationary and in contact with the box sides, while the blocks 100 carry the fingers 103 forward to turn in the flap 141. The flap 141 is now, horizontal and in the path of the holder 40 which immediately descends and folds the flaps 141 against the inside of the box. The holder 40 is now held stationary in the box for a short interval during which a short forward movement of the blocks 100 takes place and as the presser jaws 104 are now abutting the rear wall of the slot 107, they must also advance a slight distance which movement the yielding members 117 allow for. As the holder 40 is within the box it will be clear that the sides of the box are gripped firmly at all points and the box cover tightly glued to the form. While in this position, the fingers 103 are above the top of the sides of the box and in order to glue this top portion to the form, the cams controlling the holder and carrier give a slight release to bring the box up against the fingers 103 whereby the top is pressed into contact with the form. The box is now complete and ready for removal from the machine. The blocks 100 are therefore returned from gripping engagement and the carrier and holder raised to their normal positions during which upward movement, the cam 129 operates to swing the end brushes 127 to one side and the cam 126 throws the ejector forward to strike the box out of the machine. The worm gear 6 has now completed its revolution and the projecting lug 19 strikes arm 12 and through lug 11 engages the trip lever 10 to return rod 8 which movement throws the clutch out and brings the machine to a stop.

Having thus described my invention, what I claim as new and desire to secure by Letters Patent, is:—

1. In a box making machine, an operating shaft, a form carrier, a holder, means to fold a cover over a box form, a cam to reciprocate said holder at a predetermined time, jaws to support a form during such reciprocation, blocks carrying said jaws, a sliding member adapted to engage each of said blocks, a crank operating mechanism, for said sliding members, means to operate said crank mechanism, and means to press a cover against a box form.

2. In a box making machine, an operating shaft, a form carrier, a holder coöperating therewith, movable guides for said holder, an ejector, and means to shift said guides out of the path of said ejector.

3. In a box making machine, an operating shaft, a form carrier, a holder coöperating therewith, movable brush guides for said holder, an ejector, and means to simultaneously operate said guides and ejector.

4. In a box making machine, an operating shaft, a form carrier, a holder coöperating therewith, a series of stationary brush guides for said holder, a series of movable brush guides adjacent said stationary brush guides, an ejector, and means to simultaneously operate said movable brush guides and ejector.

5. In a box making machine, an operating shaft, a form carrier, a holder coöperating therewith, a series of stationary guides for said holder, a series of movable brush guides adjacent said stationary brush guides, an ejector moving in the path of said movable brush guides, and means to shift said movable brush guides during the operation of said ejector.

6. In a box making machine, an operating shaft, a form carrier, a holder, a series of stationary brush guides, a second series of brush guides, means to fold a cover over a box form, means to press a cover against a box form, an ejector, and means to move said second series of brush guides simultaneously with said ejector.

7. In a box covering machine, the combination with covering devices for folding the covering material against the sides and ends of a box, of presser jaws adapted to engage said covering material, spindles secured to said jaws, blocks having recesses therein to receive said jaws and apertures for said spindles, and yielding means to permit relative movement between said jaws and blocks.

8. In a box covering machine, the combination with covering devices for folding the covering material against the sides and ends of a box, of presser jaws adapted to engage said covering material, blocks having apertures therein, spindles secured to said jaws and fitting one of said apertures, and springs adjustably secured in the remaining apertures and connected to said jaws to permit relative movement between said jaws and blocks.

9. In a box covering machine, the combination with covering devices for folding the covering material against the sides and ends of a box, of presser jaws adapted to engage said covering material, blocks having apertures therein, spindles secured to said jaws passing through one of said apertures, supports for said spindles, followers on said spindles adapted to engage said supports, and yielding means to allow movement of said spindles after said followers engage said supports.

10. In a box covering machine, the combination with covering devices for folding the covering material against the sides and ends of a box, of presser jaws adapted to engage said covering material, blocks carrying said jaws, sliding guides for said blocks, cranks secured to said sliding guides, and means to oscillate said cranks.

11. In a box covering machine, the combination with a reciprocating plunger adapted to support and carry a box to be covered, of a holder adjustably secured above said plunger, a cross-rod supporting said holder slidingly mounted on the frame of the machine, and means to reciprocate said member.

12. In a box covering machine, the combination with a reciprocating plunger adapted to support and carry a box to be covered, of a rod slidingly mounted on the side of the frame, a cross-bar secured to said rod, a plunger rod adjustably secured to said cross-rod, a holder detachably secured to said rod and located above said lower plunger, and means to reciprocate said sliding member.

CHARLES A. GARRETT.

Witnesses:
Jos. H. Long,
J. G. Baynes.